March 22, 1932.    R. R. DOWNIE    1,850,539
TRIPPING MECHANISM FOR DUMPING SCOOPS
Filed Jan. 3, 1928    3 Sheets-Sheet 1
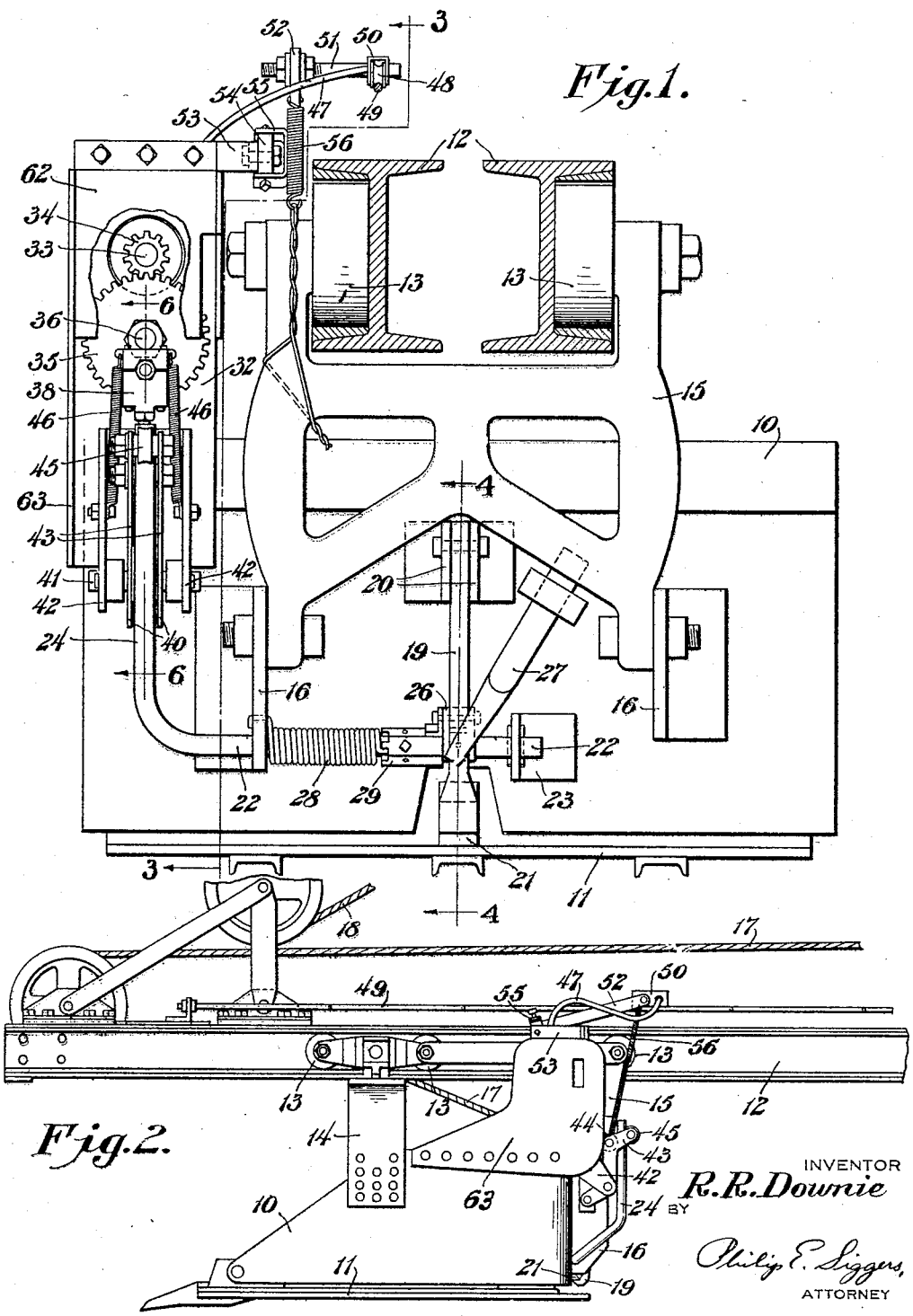

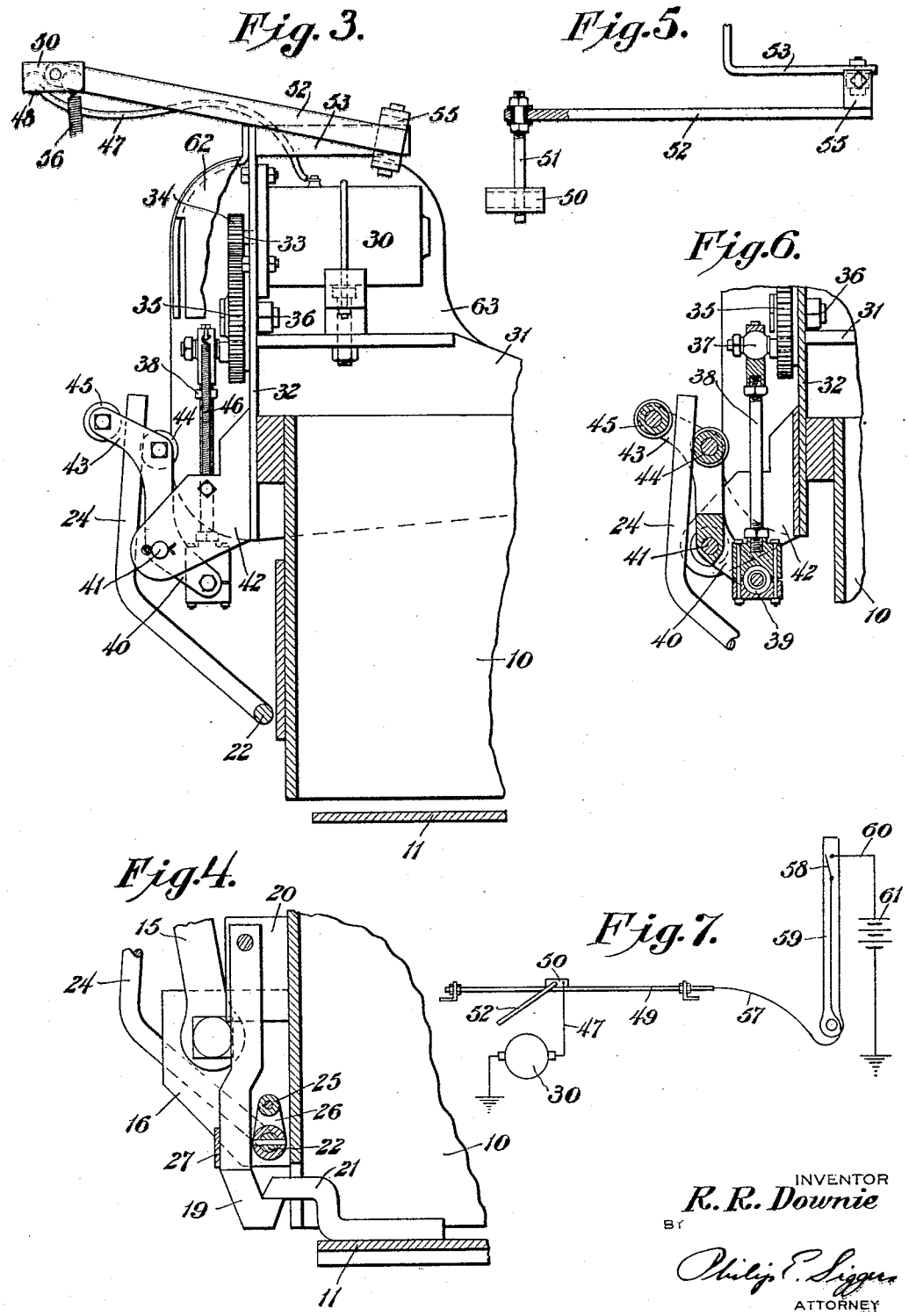

March 22, 1932. R. R. DOWNIE 1,850,539
TRIPPING MECHANISM FOR DUMPING SCOOPS
Filed Jan. 3, 1928 3 Sheets-Sheet 3
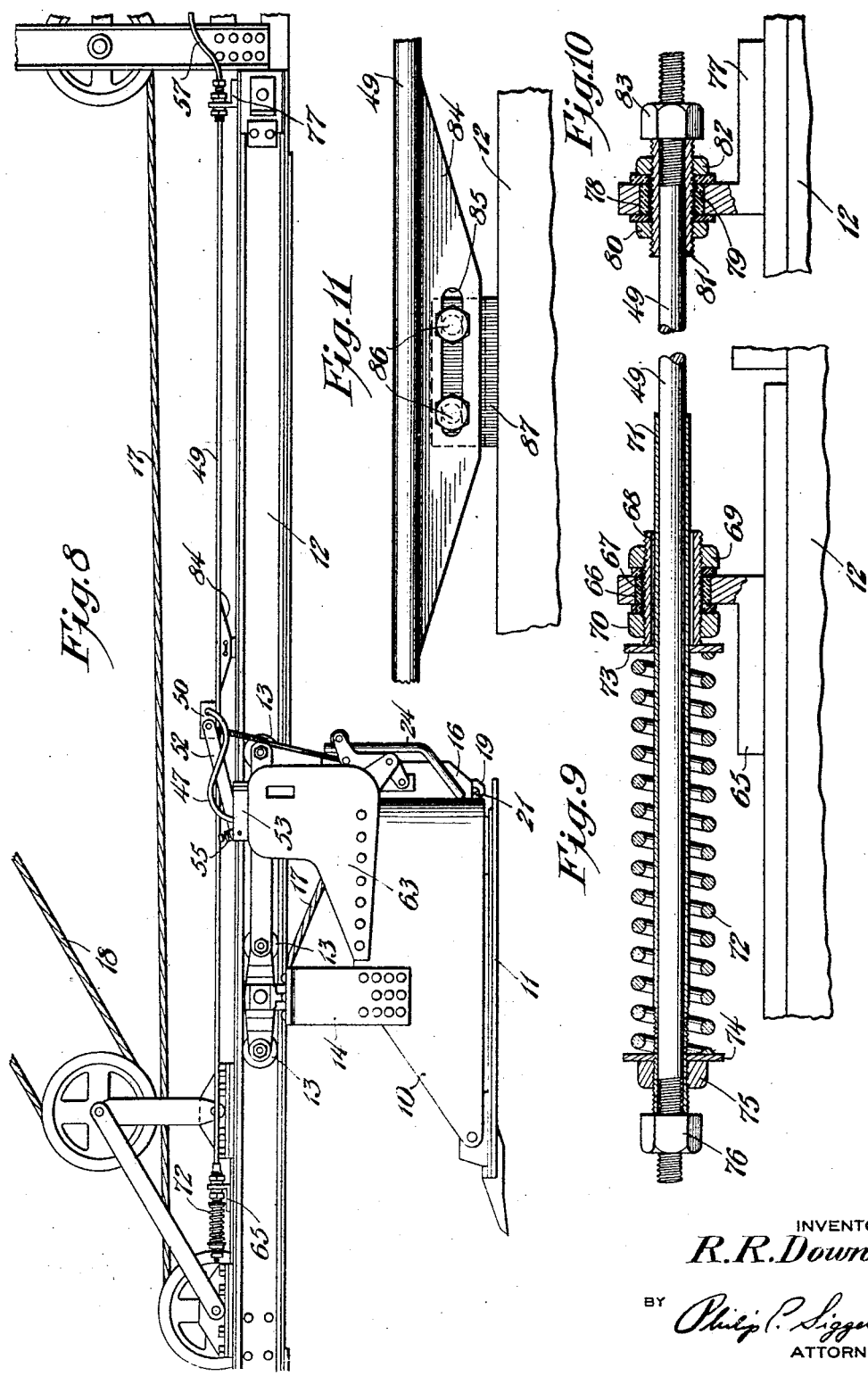
INVENTOR
R.R.Downie
BY
ATTORNEY Patented Mar. 22, 1932

1,850,539

UNITED STATES PATENT OFFICE

ROBERT REX DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA

TRIPPING MECHANISM FOR DUMPING SCOOPS

Application filed January 3, 1928. Serial No. 244,291.

This invention relates to trips for skimmer scoops and among other objects, aims to provide an efficient and dependable electrically operated device of this character.

In the drawings showing two embodiments of the invention,

Fig. 1 is a rear view of the scoop and the improved trip mechanism;

Fig. 2 is a side elevation of a skimmer scoop and a portion of the boom, with the improvements shown thereon;

Fig. 3 is a vertical sectional view taken on the line 3—3 of Fig. 1;

Fig. 4 is a fragmentary sectional view taken on the line 4—4 of Fig. 1;

Fig. 5 is a top plan view of the trolley;

Fig. 6 is a fragmentary sectional view taken on the line 6—6 of Fig. 1;

Fig. 7 is a wiring diagram of the electrical tripping mechanism.

Fig. 8 is a side elevation of a scoop and boom having a spring tensioned trolley wire to obviate contact thereof with the boom during excavation;

Fig. 9 is an enlarged detail in vertical section showing the way in which the spring tensions the trolley wire, and also one of the insulating means;

Fig. 10 is a similar view of the insulating means at the opposite end of the trolley wire; and Fig. 11 is an elevation of a trolley wire insulating support.

Referring particularly to the drawings, there is shown a skimmer scoop assembly of the same general construction as that shown and described in Patent No. 1,536,390 dated May 5, 1925, said assembly comprising a scoop 10 having a hinged dumping bottom 11 and mounted on a swinging boom 12 by means of rollers 13 connected to a bail 14 and a rear hanger casting 15, the lower end of which is mounted between brackets 16 secured to the rear end of the scoop. As heretofore, the scoop is adapted to be pulled outwardly along the boom by a line 17, and the boom is raised and lowered by line 18. Retraction of the scoop is effected by raising the boom and permitting the scoop to move down by gravity.

The latching mechanism includes a latch lever 19 pivotally mounted between a pair of ears 20 (Fig. 1) secured to the rear wall of the scoop, said latch lever engaging a keeper 21 secured to the scoop bottom 11, thus preventing the bottom from falling open. A rocker shaft 22, mounted in one of the brackets 16 and a smaller bracket 23, has its other end bent rearwardly and upwardly to form a crank arm 24 (Fig. 3). The rocker shaft passes between the latch and the rear wall of the scoop and is provided with a cam in the form of a roller 25 mounted between arms 26 which are normally in the position of Fig. 4. The cam roller 25 is adapted to bear against and rock the latch lever 19 when the rock shaft is turned. The latch lever 19 is at all times pressed by a leaf spring 27 (Fig. 1) and the cam is returned to its normal position by a coiled spring 28, surrounding the rocker shaft 22 and secured at one end to the adjacent bracket 16 and at the other end to a polygonal collar 29 having a plurality of transverse holes adapted to register with a transverse hole (not shown) in the shaft 22 through which a pin or bolt is passed. The described latching mechanism forms part of the subject matter of my Patent No. 1,511,115, in which the latch is adapted to be released by a pull on a rope or the like secured to the arm.

In the present invention an electromagnetic device, herein in the form of an electric motor 30 or the like, is adapted to operate the arm 24 to trip the latch and thus dump the scoop at the will of the operator, and without imposing on him the labor of pulling a line. In the present instance the motor is mounted on a bracket 31 suitably secured to the side of the scoop 10 at the rear end thereof, and above the body of the scoop. An upright plate 32 is secured to the bracket 31 and is provided with a suitable aperture through which the motor shaft 33 extends. A pinion 34 on the motor shaft 33 meshes with a larger gear 35 rotatably mounted on a stub shaft 36 secured to the plate 32 below the motor 30, and the gear 35 is connected with mechanism for rocking the latch lever, as will be described.

Secured to the gear 35 is an outwardly projecting wrist pin which is effectively a crank, having a ball 37 providing a universal connection to the upper end of an adjustable pitman 38 (Fig. 6), the lower end of which is universally connected by a ball 39 to the lower bifurcated end of a bell crank lever 40. The lever 40 is pivoted intermediate its ends on a pin 41 or the like mounted in brackets 42 secured to the lower end of the plate 32. The upper end of the bell crank lever 40 is formed with outstanding spaced arms 43 having rollers 44 and 45 interposed between their ends and preferably grooved to receive the round upper end of the arms 24 between them.

As the gear 35 is rotated, the pitman 38 pulls up on the lower end of the bell crank 40, which moves the arms 43 and the rollers outwardly. The inner roller 44 pushes the upper end of the arm 24 outwardly thereby rocking the shaft 22 to release the latch 19 from the keeper 21 and permitting the scoop bottom 11 to open. To return the several parts to normal position, contractile coiled springs 46 are secured between the upper ends of the pitman 38 and the brackets 42. Thus when the current to the motor is turned off, the springs 46 will pull the pitman downwardly to its lowermost, or normal position.

The motor 30 receives its electrical energy from a conductor 47, connected to trolley wheels 48 (Figs. 1, 2 and 3) adapted to engage a trolley wire 49 mounted on the boom 12 (Fig. 2) but insulated therefrom as shown in Figs. 9, 10 and 11.

Herein the wheels 48 are mounted within a U shaped casing 50 (Figs. 1, 3 and 5) which is rockably mounted near the end of a stub shaft 51, adjustably secured to and insulated from the upper end of a trolley pole 52. The lower end of the trolley pole 52 is universally connected to a bracket 53 or the like secured to the upper end of the plate 32. In the present instance the universal connection comprises a block 54, pivotally connected to the end of the bracket 53 and also pivotally mounted between the arms of a U-shaped clip 55 to which the trolley pole is rigidly secured. A contractile coiled spring 56 connected to the upper end of the trolley pole and the rear hanger casing 15, holds the wheels 48 in contact with the trolley wire 49.

To prevent the trolley wire from breaking when the boom bends under the strains imparted by various kinds of work, the trolley wire is flexibly mounted. This may be accomplished either by jointing the wire at intervals, or by putting a longitudinal stress on the wire, as by means of spring tension. Fig. 2 illustrates the former expedient and Figs. 8 and 9, the latter. Insulating elements, shown in Figs. 8 and 11, will be used to prevent contact between the boom and wire when the boom bends.

A conductor 57, which is preferably universally connected to the inner end of the trolley wire (not shown), leads to a switch 58 (indicated in Fig. 7) located on one of the operating levers 59 of the machine. A second conductor 60 leads to a suitable source of current 61 (e. g., a storage battery) having one of its terminals grounded. As one terminal of the motor 30 is grounded it will be readily understood from Fig. 7 that by closing the switch 58, the motor will be energized to release the latch 19.

Suitable guard plates 62 and 63 may be used to protect the mechanism from being damaged by any of the excavated material, or during dumping into trucks.

Referring to the form of the invention shown in Figs. 8–11, it is seen that the trolley wire 49 is supported on the boom 12 at its outer end by an angle bracket 65 (which may be welded to the boom or to a plate also welded to the boom). As the boom is a conductor which is grounded, the trolley wire must be insulated at suitable intervals from the boom. Referring to Fig. 9, the angle bracket 65 is shown as having a perforation 66 therein sufficiently large to pass the trolley wire 49, an insulating bushing 67 fitting snugly into said perforation and surrounding the trolley wire. A screw-threaded sleeve 68 supports and protects the insulation 67 and nuts 69, 70 threaded on said sleeve clamp the insulation so as to be immovable in bracket 65. The trolley wire 49 passes freely through sleeve 68 so that it may move longitudinally relative to bracket 65 and has a sleeve 71 secured thereto, as by welding, and a long coil spring 72 between washers 73 and 78. Washer 73 abuts against one end of sleeve 68 while washer 74 is confined by nut 75 threaded on sleeve 71. A lock nut 76 prevents loss of nut 75, which resists the thrust of the tension spring.

The opposite end of the trolley wire is supported by an angle bracket 77, at the inner or pivoted end of the boom. This bracket has a perforation 78 in which the insulating bushing 79 fits, said insulation being held by nuts 80, 82 and surrounding sleeve 81 on which said nuts are threaded. A nut 83, threaded on the end of the trolley wire, abuts sleeve 81 and prevents longitudinal movement of the trolley wire through the perforation in angle bracket 77, while permitting longitudinal adjustment.

From the foregoing, it will be clear that the trolley wire is subjected to longitudinal tension because of the strong spring 72, which tends to straighten said wire if bent laterally because of deflections of the boom during excavation. Such straightening will tend to prevent contact of the trolley wire with the top of the boom, even when the boom is temporarily bent into an arcuate shape because of the severe stresses. To make such contact impossible, one or more insulating supports are provided at points intermediate the brackets 65, 77, one of these insulating supports being shown in Fig. 11. The trolley wire 49 is brazed to an inverted hanger 84 having a slot 85 through which pass studs 86 screwed into an insulating block 87 secured to the top of the boom. Thus longitudinal movement of the trolley wire for adjustment is permitted.

The described construction provides insulating supports on the boom for the trolley wire, with the outer part of the wire subjected to strong tension and hence held off the top of the boom even when bent at its outer end.

From the foregoing, it will be obvious that a device has been provided which will permit the operator to release the scoop latch instantly regardless of the position of the scoop on the boom, without removing his hands from either control lever. The mounting of the trolley and the trolley pole insures a constant electrical supply to the motor. Furthermore, the device may be attached to the manually operated latch mechanism now in use without any alterations except bending the arm 24.

Obviously the present invention is not restricted to the particular embodiments thereof herein shown and described. Moreover, it is not indispensable that all the features of the invention be used conjointly, since they may be employed advantageously in various combinations and sub-combinations.

What is claimed is:—

1. In combination with the boom of an excavating machine, a scoop having a dumping door and latch mechanism for the door; a trolley wire mounted on and insulated from the boom and jointed at numerous points so as to minimize the possibilities of breakage of the wire and contact of the wire with the boom, due to bending and twisting of the boom by the reactions of excavation; an electric motor mounted on the scoop and operatively connected to trip the latch mechanism; means carried by the scoop and engageable with the trolley wire to carry current from the trolley wire to the motor; and a switch in circuit with the trolley wire to control the motor.

2. In combination with the boom of an excavating machine, a scoop mounted on the boom to travel along it and having a dumping door and latch mechanism for the door; a trolley wire mounted on and insulated from the boom; means including a coil spring pulling on one end of the trolley wire to tend to hold said wire taut when the boom bends under the stresses of excavation; an electric motor mounted on the scoop and operatively connected to trip the latch mechanism; means carried by the scoop and engageable with the trolley wire to carry current from the trolley wire to the motor; and a switch in circuit with the trolley wire to control the motor.

3. In combination with the boom of an excavating machine and an excavating scoop which is supported by and travels along the boom, said scoop having an electrically operated latch-tripping mechanism; a trolley wire mounted on the top of the boom; insulating means on the boom for supporting the wire; and means co-operating with said insulating means to prevent contact of the wire with the boom when the boom is bent by the stresses of excavation.

4. In combination, a traveling scoop having a dumping door; latch mechanism for the door; an operating arm for the latch mechanism; a crank shaft; an electric motor adapted to rotate the crank shaft; a bell crank lever; a pitman connecting the crank shaft and the bell crank lever; means on the bell crank lever constructed and arranged to actuate the operating arm; and a switch for controlling the motor.

5. In combination with a traveling scoop having a dumping door; latch mechanism for the door and an operating arm for the latch mechanism; a crank shaft; an electric motor adapted to rotate the crank shaft; a bell crank lever; a pitman connecting the crank shaft and the bell crank lever; means on the bell crank lever constructed and arranged to actuate the operating arm; means connected to the pitman to return the operating arm to latching position; and a remote control switch for the motor.

6. In combination with an excavating machine having a boom; a traveling scoop on the boom; a dumping door for the scoop; latching means for the door comprising a latch, a latch-tripping arm, and a spring urging the latch into engaging position; a trolley wire mounted on the boom and insulated therefrom; an electric motor on the scoop; means carried by the scoop and engageable with the trolley wire to conduct current from the wire to the motor; mechanism operated by said motor to trip the latch; said mechanism comprising a gear, a pitman connected to the gear, and a lever connected with the pitman and engaging the latch-tripping arm; and a spring connected with the scoop and with said pitman for restoring said mechanism after each tripping movement to the position wherein engagement of the latch is assured.

7. In combination with the boom of an excavating machine; a scoop having a dumping door and latch mechanism for the door; a trolley wire mounted on the boom and insulated therefrom; a source of electrical energy connected to the trolley wire through a switch; an electric motor operatively connected to the latch mechanism; a trolley universally connected to the scoop; a contact wheel mounted within a casing which is rockable vertically on the end of the trolley, the contact wheel being engageable with and movable over the trolley wire; and conductor means connecting the trolley wheel with the motor so as to energize the motor when the switch is closed.

8. In combination with the boom of an excavating machine having a scoop; a dumping door for the scoop; latch mechanism for the door; an operating arm for the latch mechanism; a bell crank lever; rollers on the bell crank lever adapted to actuate the operating arm; a crank; a pitman universally connected to the bell crank lever and to said crank; and an electric motor operatively connected to the crank.

9. In combination with the boom of an excavating machine having a scoop; a dumping door for the scoop; latch mechanism for the door; an operating arm for the latch mechanism; a bell crank lever; rollers on the bell crank lever adapted to actuate the operating arm; a crank; a pitman universally connected to the bell crank lever and to said crank; an electric motor operatively connected to the crank; and means to return the crank to normal position when the motor is de-energized.

10. In a skimmer scoop, in combination, a boom; and an electrical conductor mounted on the upper side of the boom but spaced therefrom; insulators on the boom and supporting the conductor, said conductor being jointed at intervals so that, when the boom bends, the conductor will bend at the joints and hence will not be permanently deformed, or broken by repeated bending but will remain out of contact with the boom.

11. In combination with the boom of an excavating machine, a scoop with a dumping door; latch mechanism for the door; an operating arm for the latch mechanism; a bell crank lever; rollers on the bell crank lever adapted to actuate the arm; a crank; a pitman universally connected to the bell crank lever and to said crank; an electric motor; a gear driven by the motor and carrying said crank; and a pair of springs, one on each side of the crank and extending to the scoop, when they are connected, so as to exert a continuous pull on the crank to bring it out of a dead-center position with respect to the gear shaft.

In testimony, that I claim the foregoing as my own, I have hereto affixed my signature.

ROBERT REX DOWNIE.